3,770,786
FERROCENYL HYDROXYBUTENES
Chester W. Huskins, Huntsville, Ala., and Albert J. Thomas, Jr., Fayetteville, Ark., assignors to the United States of America as represented by the Secretary of the Army
No Drawing. Filed Mar. 29, 1971, Ser. No. 129,196
Int. Cl. C07f 15/02
U.S. Cl. 260—439 CY                              1 Claim

ABSTRACT OF THE DISCLOSURE

Disclosed is the liquid, olefinic ferrocene derivative derived from vinyl magnesium chloride and diacetyl ferrocene, which derivative can be co-cured with hydroxy terminated polybutadiene polymers (HTPB) to yield a polymeric binder system for propellants having a chemically bound ballistic modifier as an integral part of the binder. The ferrocene derivative is a difunctional compound having two hydroxyl groups per molecule. Curing of the HTPB and the dihydroxy-ferrocene compound is accomplished by diisocyanates which is added in sufficient quantity so that all the hydroxyl groups of the HTPB and the ferrocene derivative are reacted.

BACKGROUND OF THE INVENTION

Ferrocene catalysts have been used in solid propellants to provide increased burning rates of the propellants. The liquid ferrocene derivative, such as n-butyl ferrocene, has been used successfully as a burning rate catalyst. The liquid state of the compound has offered certain desirable properties from the propellant processing standpoint, in that higher solids loading can be achieved at a lower mixing viscosity. In other words, the liquid catalyst provides plasticizer function to the propellant formulation during mixing and casting of the propellant.

The liquid ferrocene derivatives of the prior art offer these disadvantages:

(a) Migration to rocket motor liner and insulators
(b) Volatility
(c) Crystallization at low temperatures to reduce the propellant strain properties.

Desirable would be a ferrocene derivative which offers the advantages of the liquid state compound while being capable to overcome the disadvantages of a liquid ferrocene which retains its liquid characteristics in a cured propellant.

Therefore, an object of this invention is to provide a liquid ferrocene derivative that can be co-cured with a binder material to chemically bind the ferrocene derivative to the binder system.

Another object of this invention is to provide a liquid ferrocene derivative which can be crosslinked with the same crosslinking agent used for crosslinking the polybutadiene polymer which forms the propellant binder.

A further object of this invention is to provide a liquid ferrocene derivative which contributes to the curing of the propellant by providing crosslinking sites for reacting with the crosslinking agent and which is soluble in the polybutadiene polymer which helps to chemically bind the ferrocene derivative within the propellant binder.

SUMMARY OF THE INVENTION

A ferrocene compound has been discovered that can be co-cured with hydroxy terminated polybutadiene polymers (HTPB) to chemically bind the ferrocene compound, which functions as the burning rate catalyst, to the binder material of the propellant composition.

DESCRIPTION OF THE PREFERRED EMBODIMENT

A liquid ferrocene derivative which is the adduct of vinyl magnesium chloride and diacetyl ferrocene is curable with the propellant system to chemically bond the ferrocene derivative to the propellant system during the cure process. The liquid ferrocene derivative serves as the burning rate catalyst for the propellant system. The advantages of the liquid derivative are maintained during the propellant mixing but the disadvantages of migration, volatility, and crystallization are overcome by the chemical bonding and curing of the liquid to the propellant system.

The chemical structure of the liquid ferrocene derivative of this invention is illustrated as follows:

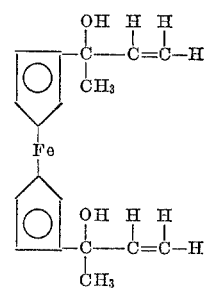

Ferrocene Derivative (A)

The compound whose structure is set forth above, offers desirable features from at least two standpoints:

(a) compound is difunctional [OH]; and
(b) the olefinic nature of the molecules contribute to the liquid properties of the compound.

The hydroxyl difunctionality of the molecules permits it to be co-cured with hydroxyl terminated polybutadiene polymer (HTPB) using a diisocyanate curing agent such as dimeryl-diisocyanate (DDI), toluene diisocyanate (TDI), isophorone diisocyanate (IPDI), etc. Other similar ferrocene structures will work equally well—provided they have dihydroxy functionality, and they are liquids that are soluble in the HTPB binder.

The ferrocene derivative of this invention was tested for curing purposes by mixing with HTPB binder and dimeryl diisocyanate. Curing was successful. Further testing indicated that ballistic modification was achieved.

Evaluations of the ferrocene derivative of this invention for propellant use indicate that the derivative weight range from about 5 to about 20 weight percent of the propellant composition is very satisfactory for the ballistic and curing functions. Other propellant ingredients include an oxidizer, preferably ammonium perchlorate, in amounts from about 60 to about 72 weight percent, metal fuel (e.g. powdered aluminum, magnesium, titantium, zirconium, and boron) in amounts from about 5 to about 20 weight percent, a crosslinking agent (DDI, TDI, IPDI, etc.) in amounts from about 0.5 to about 2.0 weight percent, and trace amounts of additives for specific functions desired (e.g. blending aids such as lecithim, stabilizers, special ballistic agents, etc.).

Table I sets forth a propellant standard using n-butylferrocene and a test propellant using the ferrocene derivative of this invention. Each of the propellants are mixed utilizing standard mixing equipment and procedures.

TABLE I

| Ingredients | Standard propellant | Test propellant |
|---|---|---|
| Hydroxyl-terminated polybutadiene prepolymer | 14.0 | 10.0 |
| Dimeryl-diisocyanate | 1.0 | 2.0 |
| N-butylferrocene | 5.0 | ---- |
| Ferrocene derivative (A) | ---- | 8.0 |
| Aluminum | 10.0 | 10.0 |
| Ammonium perchlorate | 70.0 | 70.0 |

The test propellant of Table I has the ballistic modifier crosslinked and tied to the binder which offers improved physical properties not offered by the standard propellant using the liquid catalyst (n-butylferrocene) which has a tendency to migrate to propellant liners and insulators, crystallize at low temperature, and to volatilize during propellant processing and curing.

The ferrocene derivative of this invention has dihydroxyl functionality and is used with HTPB binder and diisocyanate crosslinking agents; however, similar compounds with dicarboxyl functionality could be used with carboxyl terminated polybutadiene polymers (CTPB). Again, the carboxyl functionality compounds must be difunctional, liquids, and soluble in the CTPB polymer. Appropriate crosslinking or curing agents for CTPB systems include compounds such as 2-methylaziridinylphosphine oxide, dibutylcarbitol formal, 2,3-dihydroxypropyl-bis (2-cyanoethyl) amine, and many other similar compounds which react with carboxyl groups.

We claim:
1. A compound having the formula:

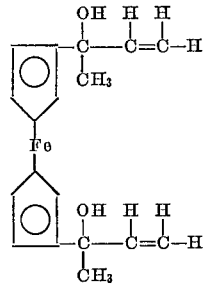

References Cited
UNITED STATES PATENTS

| | | | |
|---|---|---|---|
| 3,598,850 | 8/1971 | Dewey | 260—439 CY |
| 3,132,165 | 5/1964 | Borecki | 260—439 CY |

LELAND A. SEBASTIAN, Primary Examiner

U.S. Cl. X.R.

149—19, 22, 44